United States Patent [19]

McAlevey et al.

[11] Patent Number: 4,736,403
[45] Date of Patent: Apr. 5, 1988

[54] TELEPHONE LINE TESTER

[75] Inventors: Richard J. McAlevey, Miami; Malcolm D. Muir, Coral Springs; Johan S. van der Laan, Miami, all of Fla.

[73] Assignee: Rice Multiphones, Inc., North Miami, Fla.

[21] Appl. No.: 894,675

[22] Filed: Aug. 8, 1986

[51] Int. Cl.⁴ .............................................. H04M 1/24
[52] U.S. Cl. ..................................................... 379/26
[58] Field of Search ................... 379/22, 24, 26, 8, 1, 379/21, 27; 340/815.01, 815.02, 815.03, 815.1, 815.18; 324/66, 133, 539, 540, 542

[56] References Cited

U.S. PATENT DOCUMENTS

| | | | |
|---|---|---|---|
| 3,916,381 | 10/1975 | Johnson, III et al. | 340/524 |
| 4,074,187 | 2/1978 | Miller et al. | 324/73 R |
| 4,197,435 | 4/1980 | Jackson et al. | 379/2 |
| 4,317,967 | 3/1982 | De Vries et al. | 379/27 |
| 4,385,336 | 5/1983 | Takeshita et al. | 379/26 |
| 4,513,179 | 4/1985 | Phillips et al. | 379/27 |
| 4,575,588 | 3/1986 | Vande Uyver | 379/22 |
| 4,588,862 | 5/1986 | Grabowy | 379/26 |
| 4,600,810 | 7/1986 | Feldman et al. | 379/21 |

Primary Examiner—Stafford D. Schreyer
Attorney, Agent, or Firm—Charles E. Baxley

[57] ABSTRACT

A circuit tests the telephone line for polarity, line voltage and open/short circuit. The polarity test is accomplished using opposite polarity LED elements which generate a visual indication of correct or erroneous polarity. The line voltage is tested by comparators which compare the line voltage to predetermined limits and generate a visual indication if the voltage is within or without the limits. The tip or ring ground short circuit is detected by monitoring the AC voltage while in the ON HOOK state. If a ground short is present on either tip or ring of the telephone line, the AC voltage becomes high due to power frequency coupling. A comparator detects this voltage and generates a visual indication if the voltage is greater than a predetermined value.

9 Claims, 3 Drawing Sheets

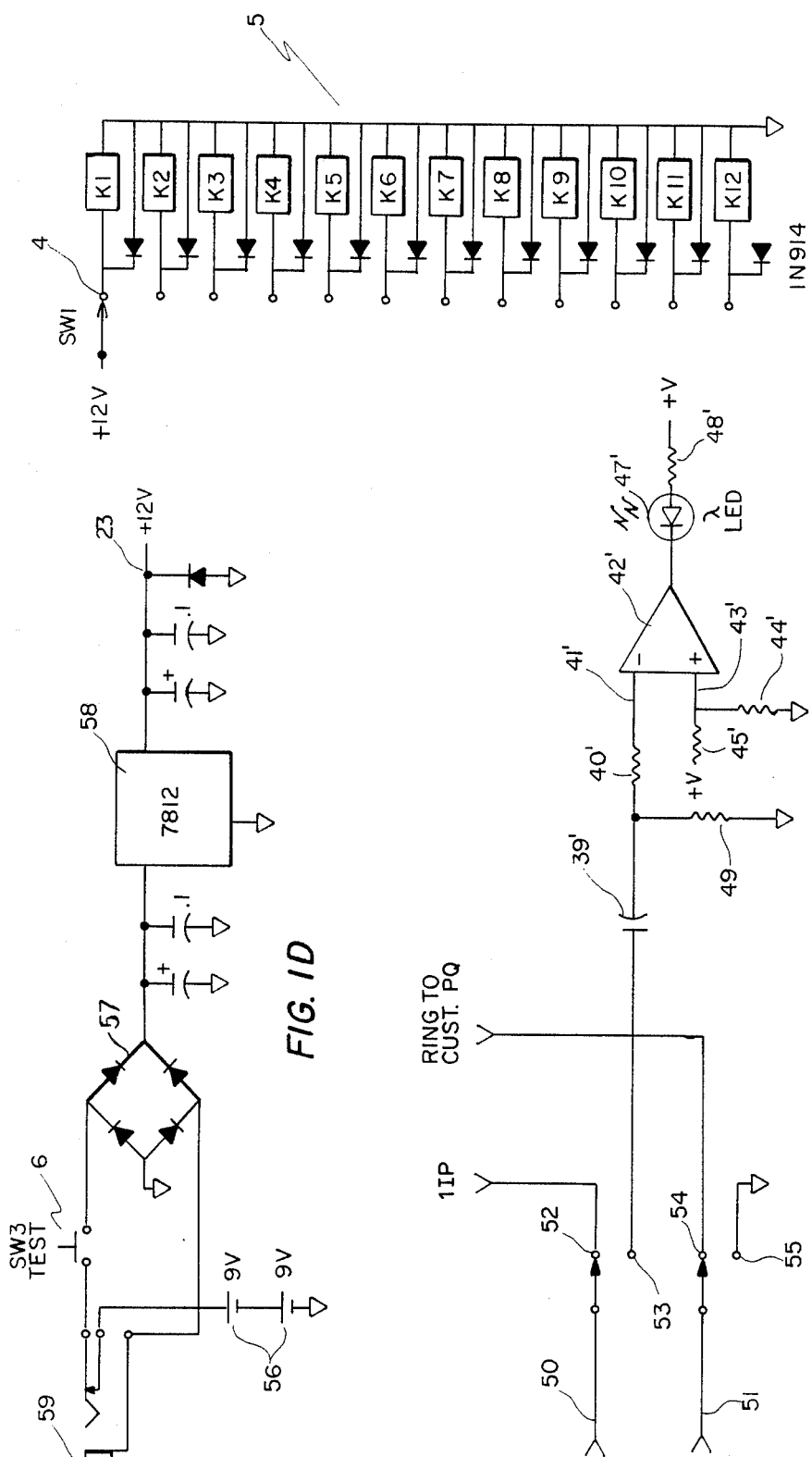

TELEPHONE LINE TESTER

SUMMARY OF THE INVENTION

The present invention relates to a device for fault testing the telephone lines into the user's telephone and permits the user to isolate a problem as to whether the problem is in the phone lines or in the terminating telephone equipment.

With the advent of de-regulation of the telephone industry, it has become apparent that a number of different companies are providing equipment for connection to the telephone lines. The ownership and maintenance responsibility for said equipment may reside in several different organizations depending on the manufacturer of the equipment, the wiring, the PBX and the provider of the local and/or long distance service. It is desirable therefore to enable the user of the equipment to isolate the location of a problem by providing the user with a convenient simple device to enable a check to be made of the line from the telephone to see whether it is properly conditioned. If the line test indicates that the telephone line is functioning properly, then the user can be certain that the problem lies in the telephone set and can procure appropriate repair services. If the line is not fuctioning, then the user can obtain the services of the telephone service supplier to remedy the situation.

Two basic concepts exist in the invention for conducting a comprehensive check to the telephone line. Testing for an open line, shorted line and correct polarity is accomplished dynamically by simulating "OFF HOOK" conditions to the telephone line and then sensing for proper conditions. Testing for a ground short conditions to either tip or ring is accomplished statically by monitoring the AC voltage on the line while in the "ON HOOK" state. Under normal (no ground short) conditions, the AC voltage is very low. If a ground short is present on either tip or ring of the telephone line then this voltage becomes much higher due to power frequency coupling. This increased voltage is detected and used to provide an indication of a ground fault.

The tester can be constructed as the multi-line test unit described herein with either battery power or AC power, or, by eliminating the multi-line (relay) capability, the tester can be constructed as a single line unit for the home owner (being only battery powered).

A principal object of the present invention is to provide the telephone user with a quick and easy way to check out the telephone line.

Another object of the present invention is the provision of a telephone line tester which checks for short or open circuit, line voltage on the phone line and tip or ring ground short.

A further object of the present invention is the provision of a battery or AC operated portable line tester which glows green for a good line connection and a good line voltage and glows red if either of the above are bad. Additional LED indicators are provided which will glow green if line polarity is correct or red if line polarity is reversed. Another LED indicator is provided to glow red if a tip or ring ground short is present.

Another object of the invention is to enable the user to isolate telephone problems between the telephone and the telephone line.

A further object of the invention is the provision of a simple tester which permits the user to pinpoint the location of a problem without the necessity for calling specialized technical service personnel.

BRIEF DESCRIPTION OF THE DRAWING

These as well as further objects and advantages of the invention will become apparent to those skilled in the art from a review of the specification and accompanying drawings in which:

FIGS. 1A, 1B, 1C and 1D taken together is a schematic diagram of the multi-line test circuit in accordance with the invention; and FIG. 2 is a schematic diagram of another embodiment of the ground fault detector circuit used in FIG. 1.

DETAILED DESCRIPTION

Figure 1A:
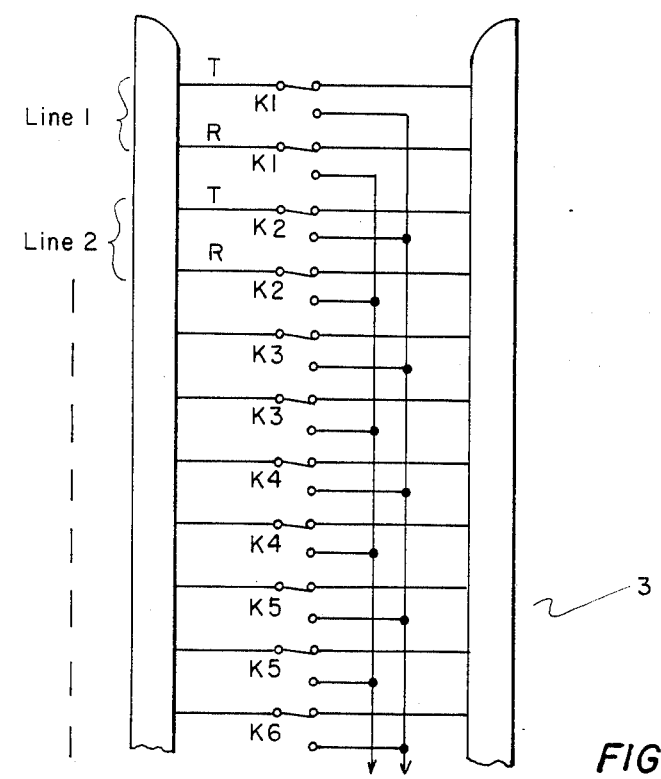
Figure 1A:
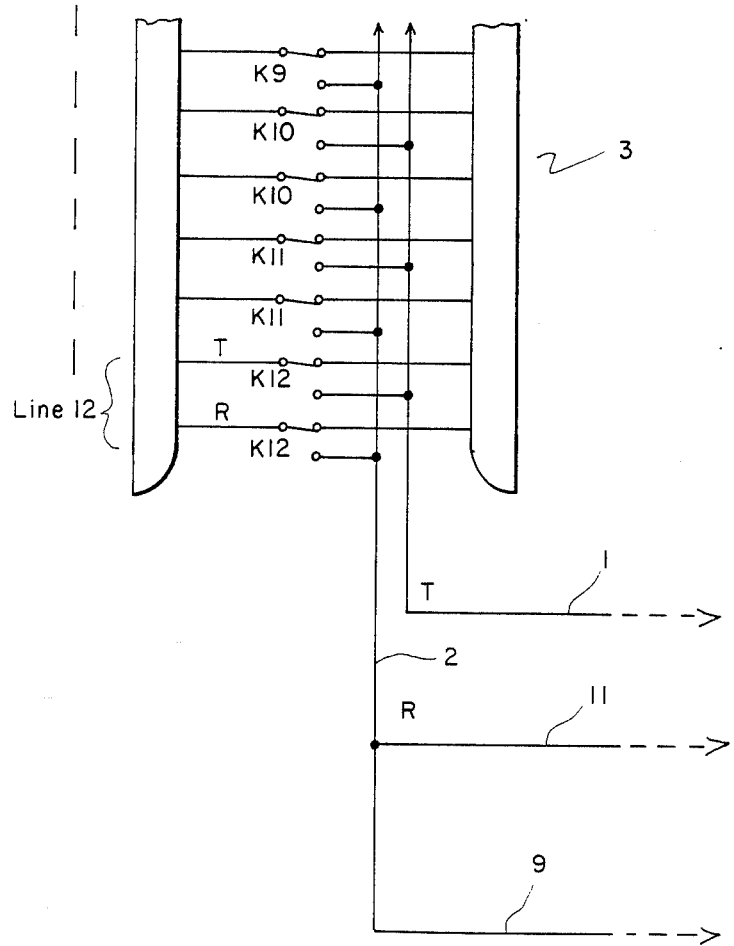
Figure 1B:
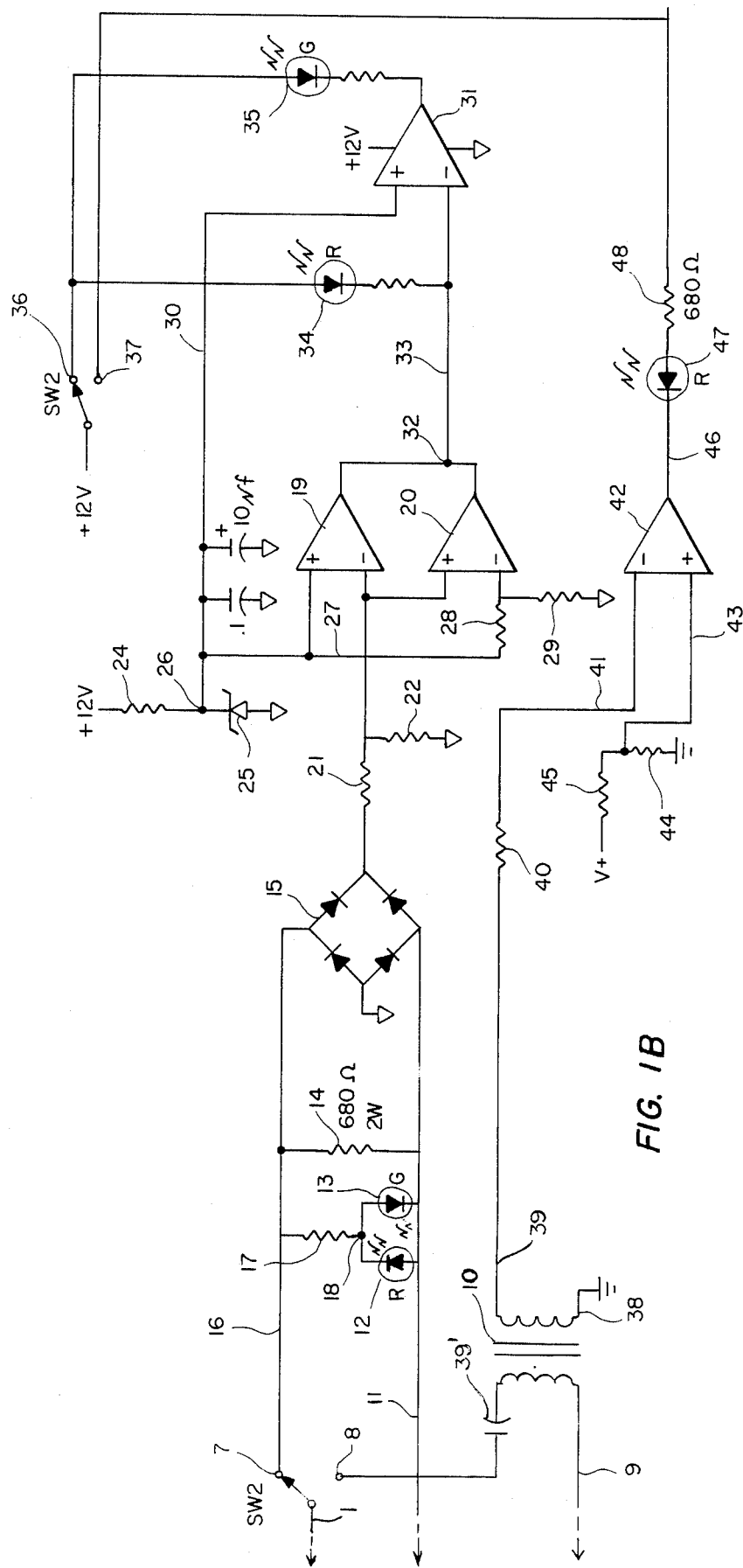

In FIGS. 1A and 1B, numeral 1 denotes the tip line and numeral 2 is the ring line of a telephone line being tested. A relay bank 3 (FIG. 1A), consisting of twelve DPDT relays, feed tip and ring lines 1 and 2 via normally open contacts. Line One tip is connected to the upper contact of relay K1 while Line One ring is connected to the lower contact of relay K1. The same is true for tip and ring of lines Two through Twelve being connected to relays K2 through K12 respectively. In FIG. 1C, a twelve position switch 4 SW1 in FIG. 1C selects individual relay coils K1 through K12 shown generally at numeral 5. A selected relay coil is energized when a test switch 6 (shown in FIG. 1D) is depressed thereby applying voltage to the circuit. With none of the K1 to K12 relay coils 5 energized (normal operating position), the normally closed contacts of the relays 3 connect the telephone lines directly to the terminating telephone equipment. The tester is therefore not connected to any telephone line circuit until test switch 6 is depressed.

FIG. 1D shows the battery operated push-button plugin portion of the circuit of FIG. 1B. Two standard 9 v batteries 56 are connected to phone plug 59. Plug 59 is connected to bridge 57 via a TEST pushbutton switch 6. Phone plug 59 has a normally closed positive contact and allows the power to be supplied from a power transformer instead of from batteries. The output of bridge 57 is connected to element 58 a 7812 integrated circuit positive 12 V regulator, to generated a +12 v output at point 23 when push-button 6 is depressed. The +12 V output at point 23 is the +12 V and V+ inputs in the other figures of the drawings.

Referring now to FIG. 1B, tip line 1 is connected to a two position switch having positions 7 and 8. With the two position switch set to select position 7, the circuitry to test for open-shorted line, correct line voltage and polarity is connected to the selected telephone line. With the two position switch set to position 8, the circuitry to test for tip or ring ground short is connected to the selected telephone line. The ring line 2 is connected via line 9 to one side of a coupling transformer 10 in the ground short test circuit. Additionally, ring line 2 is connected via line 11 to the anode of a red (reverse) polarity LED 12 and the cathode of a green (normal) polarity LED 13. Likewise, line 11 is connected to the lower side of a line terminating resistor 14 and to the lower side of a diode bridge 15. The tip line 1 at two position switch point 7 is connected via a line 16 to the upper end of a LED current limiting resistor 17. The lower end of LED current limiting resistor 17 is connected to the common point 18 of the cathode of red polarity LED 12 and the anode of green polarity LED 13. Likewise, line 16 is connected to the upper end of line terminating resistor 14 and to the upper side of diode bridge 15. The output of diode bridge 15 is connected as one of the inputs to comparators 19 and 20. Resistors 21 and 22 are connected as a voltage divider between the output of bridge 15 and the inputs to comparators 19 and 20.

A voltage source consisting of the V+ supply 23, a resistor 24 and a Zener diode 25 generates a fixed voltage at point 26. This voltage is connected as the second input to comparators 19 and 20 via a line 27. Resistors 28 and 29 connected as a voltage divider couple line 27 to comparator 20. In addition, a line 30 connects the voltage at point 26 as one input to another comparator 31.

The output of comparators 19 and 20 are connected together at a point 32 as a wire "OR" which via a line 33 is connected as the other input to comparator 31.

Two further LED's, 34 and 35 are connected to line 33 and to the output of comparator 31, respectively. LED 34 glows red and LED 35 glows green.

The LED's 34 and 35 are connected to the V+ supply 23 via another arm of the two position switch at point 36. Position 37 of the two position switch connects to V+ supply 23 to the LED indicator for the ground short test section of the circuit.

The upper position of the two position switch, as shown in FIG. 1B, at 7 and 36, is the first operating position connecting the telephone line to the test circuitry described above. The lower position of the two position switch 8 and 37 connect tip 1 to series blocking capacitor 39 and the primary of coupling transformer 10 respectively. This is the tip or ring ground short test position. The secondary of coupling transformer 10 has its lower end 38 returned to circuit ground. The upper end 39 of coupling transformer 10 is connected to a series isolation resistor 40. Series isolation resistor 40 is then connected via a line 41 to the inverting input of a comparator 42. The other input of comparator 42 is connected via a line 43 to a voltage divider consisting of resistors 44 and 45 which is used to set the comparison voltage. The output of comparator 42 is connected via a line 46 to the series combination of a LED 47 and a limiting resistor 48 to the V+ supply at switch point 37.

In the tip or ring ground short test position, tip and ring of the telephone line are connected to the two position switch at positions 8 and 37 respectively. If no ground short exists to either tip or ring, the AC voltage present at coupling transformer 10 will be very low. This condition will not overcome the comparison voltage on line 43 therefore, comparator 42 will not turn on and the LED 47 will not be illuminated. If a ground short does exist to either tip or ring of the telephone line a large AC voltage, due to power line frequency coupling, will be present at the coupling transformer 10. This voltage will be coupled across the transformer and be present at the inverting input to comparator 42. This voltage will be large enough to overcome the comparison voltage on line 43, therefore the comparator 42 will turn on and the LED 47 will illuminate indicating a ground short condition exists.

The circuit operates as follows: when test switch 6 is depressed, relay coil 5 as selected by line select switch 4 is energized disconnecting the selected telephone line from terminating equipment and connecting it to the test circuit via lines 1 and 2. LED 12 will glow red if line polarity is reversed or LED 13 will glow green if line polarity is correct. LED 34 will glow red if selected telephone line voltage is above 22.5 VDC or below 2 VDC or LED 35 will glow green if selected telephone line voltage is below 22.5 VDC or above 2 VDC.

To check for ground short to either tip or ring of the selected telephone line the two position is set to the lower position 8 and 37 to implement the operation described above.

Resistors 44 and 45 used to set the comparison voltage may be replaced with a potentiometer to provide a sensitivity adjustment.

FIG. 2 shows another embodiment of the ground fault detection portion of the circuit of FIG. 1B. The main differences between FIG. 2 and the circuit of FIG. 1B is the elimination of coupling transformer 10 from the FIG. 2 version. Elimination of the transformer 10 requires the use of a floating power supply for the rest of the circuit. The embodiment of FIG. 1B allows the use of a comparator without the comparator supply being floating. This distinction applies when the ground fault testing circuit is used as a stand alone circuit simply performing the ground fault test.

In the stand alone ground fault tester circuit of FIG. 2, numeral 50 denotes the tip line and numeral 51 the ring line of the telephone line. Tip line 50 is connected to a two position switch having positions 52 and 53. Similarly, ring line 51 is connected to another arm of the two position switch having positions 54 and 55. As described in connection with FIG. 1B, above, the upper positions of the two position switch at 52 and 54 is the normal operating position connecting the telephone line to the user's telephone equipment. The lower positions of the two position switch at 53 and 55 connect tip line 50 to series blocking capacitor 39' and ring line 51 to circuit ground. The remaining circuit elements in FIG. 2 all denoted with primed reference numerals are the same in operation and in function as the elements denoted with corresponding unprimed reference numerals in FIG. 1B. However, a resistor 49 is provided connected to resistor 40' as a voltage divider to the line 41' input of comparator 42'.

Either the circuit shown in FIG. 2 or the corresponding ground fault detection circuitry of FIG. 1B can be used either in a stand-alone configuration or can be used with the other telephone testing circuitry of FIG. 1B.

As modifications may be made to the foregoing without departing from the scope and spirit thereof, what is desired to be covered by U.S. Letters Patent is described in the appended claims.

We claim:

1. A circuit for testing a telephone line to provide an indication of whether a ground fault exists thereon said circuit comprising: comparator means having a first input and a second input; switch means connected to said first input for connecting and disconnecting said comparator to said telephone line; means for generating a threshold voltage connected to said second input; said comparator producing an output signal if a signal at said first input exceeds said threshold.

2. The circuit of claim 1 wherein a transformer is connected between said switch means and said first input said transformer coupling said switch means to said comparator; and further including a LED connected to the output of said comparator to generate a visual indication of the results of the comparison.

3. A circuit for testing a telephone line to provide an indication of whether the line is open or shorted, has the correct line voltage thereon, and is of the correct polarity said circuit comprising:

switch means connected to a telephone line for connecting said telephone line between a first portion of said circuit and a second portion of said circuit the first portion of said circuit testing said telephone line for polarity and the second portion of said circuit testing said telephone line for line voltage; open or shorted conditions, the first portion of said circuit including first and second opposite polarity LED's connected across the selected telephone line one or the other of said LED's illuminating providing an indication of the polarity of the signal on said telephone line; first and second comparators connected across said selected telephone line for comparing the signal on said telephone line with high and low reference signals and for generating an output indication of the signal on said telephone lines exceeds said high or low reference signals; a third comparator connected to the output of said first and second comparators and to said high reference signal for generating an output signal to indicate that the signal on said telephone line is within said high and low reference signals; and said second portion of said circuit including a fourth comparator having a first input and a second input, means for generating a threshold voltage connected to said second input; said fourth comparator generating an output signal if the signal on said telephone line exceeds said threshold.

4. A circuit for testing the telephone line comprising: means to monitor the AC voltage on the telephone line; first comparator means connected to said monitoring means; a source of reference voltage connected to said comparator means; said comparator means generating a first output indication if said AC voltage exceeds said reference voltage thereby indicating a ground fault; first and second opposite polarity indicators connected across said telephone line to prove an indication of line polarity; and comparison means connected across said telephone lines for generating a first output signal if said line voltage is within predetermined limits and a second output signal if said line voltage is without said predetermined limits.

5. A telephone line testing circuit comprising: means for connecting the circuit to a telephone line; polarity indicating means connected to said connection means for providing an indication of the telephone line polarity; comparisopn means connected to said connecting means for providing an indication of the telephone line voltage; and means connected to said connecting means for providing an indication of ground fault on said telephone line.

6. The circuit of claim 5 wherein said polarity indication means included opposite polarity LED elements for providing a visual indication of line polarity.

7. The circuit of claim 5 wherein said comparison means includes three comparators, a first comparator connected to said telephone line, a second comparator connected to said telephone line, and a third comparator connected to the outputs of said first and second comparators; a source of reference voltage connected to said first and said third comparators; means connected to said reference voltage source for controlling the value of said voltage said controlling means connecting said reference voltage source to said second comparator, said comparators generating a first output signal if said telephone line voltage is within the values of said reference voltage and the output of said controlling means and a second output signal if said telephone line voltage is without the values of said reference voltage and the output of said controlling means.

8. The circuit of claim 5 wherein said ground fault indication is generated by a first comparator connected to said connecting means to monitor the AC voltage on the telephone line; a source of reference voltage connected to said first comparator; said comparator generating an output if said AC voltage exceeds said reference voltage; and means connected to said first comparator for providing a visual indication of the results of said comparison.

9. The circuit of claim 5 wherein sasid comparison means includes first and second comparators connected to said telephone line, a source of reference voltage connected to said first comparator, means connected to said reference voltage source for controlling the value of said voltage, said controlling means connecting said reference voltage source to said second comparator, said comparators generating a first output signal if said telephone line voltage is within the values of said reference voltage and the output of said controlling means and a second output signal if said telephone line voltage is without the value of said reference voltage and the output of said controlling means.

* * * * *